(12) United States Patent
Osaka et al.

(10) Patent No.: US 6,462,908 B1
(45) Date of Patent: Oct. 8, 2002

(54) MAGNETIC HEAD AND STRUCTURE FOR SUPPORTING SAME

(75) Inventors: Tomohiko Osaka; Yoshikazu Sakurai, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/468,008

(22) Filed: Dec. 20, 1999

(51) Int. Cl.$^7$ .............................. G11B 5/60; G11B 21/21
(52) U.S. Cl. .................................................. 360/234.2
(58) Field of Search ............................ 360/234.2, 234, 360/224, 220, 234.3, 234.4, 234.7, 234.8, 234.9; 29/603.06, 603.2, 603.21

(56) References Cited

U.S. PATENT DOCUMENTS

| | | | |
|---|---|---|---|
| 4,413,295 A | * 11/1983 | Kato et al. | 360/110 |
| 4,593,333 A | * 6/1986 | Yanagi | 360/120 |
| 4,851,942 A | * 7/1989 | Kumasaka et al. | 360/234.8 |
| 4,971,859 A | 11/1990 | Kimura et al. | |
| 4,972,279 A | * 11/1990 | Atesmen et al. | 360/234.7 |
| 5,181,150 A | * 1/1993 | Hayakawa et al. | 360/121 |
| 5,523,986 A | * 6/1996 | Ishii | 369/13 |
| 5,790,353 A | * 8/1998 | Miwa et al. | 360/125 |
| 5,919,567 A | * 7/1999 | Okada et al. | 428/413 |
| 6,034,846 A | * 3/2000 | Ouchi et al. | 360/121 |

FOREIGN PATENT DOCUMENTS

| | | |
|---|---|---|
| EP | 0312701 | 4/1989 |
| EP | 0693517 | 1/1996 |

* cited by examiner

Primary Examiner—David Hudspeth
Assistant Examiner—Angel Castro
(74) Attorney, Agent, or Firm—Ladas & Parry

(57) ABSTRACT

A magnetic head has at least one magnetic head unit for recording to and reproducing from a flexible rotating recording medium and a slider supporting the magnetic head unit, the magnetic head unit being attached to the slider using an adhesive, the adhesive including a filler so as to substantially match a thermal expansion rate of the adhesive to a thermal expansion rate of the slider.

4 Claims, 3 Drawing Sheets

MAGNETIC HEAD AND STRUCTURE FOR SUPPORTING SAME

BACKGROUND OF THE INVENTION

1. Field of the Invention

The present invention relates generally to a magnetic head, and more particularly, to a magnetic head that supports a magnetic head unit by a slider.

2. Description of the Related Art

Generally, an ordinary magnetic disk drive that uses a flexible magnetic disk having a coercive force of 900 oersted (Oe) or less as a magnetic recording medium allows a relatively low rotational speed of for example 300 rpm. In this case, magnetic recording and reproduction is performed by causing the magnetic head to be in direct sliding contact with the magnetic disk.

However, with advances in recent years in high-density recording on magnetic disks, the rotation speed of the magnetic disk has been increased to for example 3000 rpm, with the coercive force of the magnetic disk being increased to 1500 Oe or more. As a result, in order to accommodate such so-called high-capacity magnetic disks a magnetic disk drive has appeared in which the magnetic head is provided with a narrow gap. Hereinafter such a magnetic disk drive will be referred to as a high-capacity magnetic disk drive.

Since a high-capacity magnetic disk drive allows the magnetic disk to be rotated at high speeds, the magnetic disk and the magnetic head used therein may be easily damaged if the magnetic head were to be caused to be in direct contact with the magnetic disk, as is done in the conventional magnetic disk drive.

As a result, the high-capacity magnetic disk drive is designed so that the magnetic head floats in an elevated state over the surface of the high-capacity magnetic disk due to an elevating force arising as a result of a change in an air flow caused by a relative speed between a slider surface of the magnetic head and the magnetic disk. Magnetic recording and reproduction is performed while a state of non-contact between the magnetic head and the magnetic disk is maintained.

Further, in recent years a so-called compatible-type magnetic disk drive has emerged, having a configuration in which magnetic recording and reproduction of an ordinary magnetic disk and a high-capacity magnetic disk are performed with a single magnetic disk drive. Hereinafter such a magnetic disk drive is referred to as a compatible magnetic disk drive. The compatible magnetic disk drive enables an improvement in versatility because it can be used with both ordinary magnetic disks and high-capacity magnetic disks.

Additionally, the magnetic head mounted on the compatible magnetic disk drive has both an ordinary magnetic head unit for accommodating ordinary magnetic disks and a high-capacity magnetic head unit for accommodating high-capacity magnetic disks. More specifically, each magnetic head unit is disposed on a slider made, for example, from ceramics or the like, with a central groove for flotation formed on the slider and each one of the magnetic head units being selectively positioned on either side of the central groove so as to sandwich the central groove between the magnetic head units.

In particular, the ordinary magnetic head unit has a wide gap compared to the high-capacity magnetic head unit and so is given a bulk-type head structure, with the magnetic head unit being stuck between the slider body and the panel-shaped slider side portion which together form the slider using an epoxy-type adhesive, thereby fixedly mounting the magnetic head unit on the slider.

However, with the above-described conventional magnetic head, in which the ordinary magnetic head unit is attached using an epoxy-type adhesive between the slider body and the slider side panel which together form the slider, the coefficient of thermal expansion of the epoxy resin after hardening is high. As a result, in the operating temperature range of the compatible magnetic disk drive mounting a magnetic head a slight deformation occurs in the shape of the sliding contact surface on the side on which the ordinary magnetic head unit is positioned.

That is, particularly at the higher end of the operating temperature range of the compatible magnetic disk drive, the epoxy resin thermally expands. This thermal expansion causes the epoxy resin to protrude above the surface that is in sliding contact with an ordinary magnetic disk, or, alternatively, causes a difference in level to appear between the ordinary magnetic head unit and the slider, that is, the slider body and the slider side portion. If the condition of the surface that is in sliding contact with a magnetic disk deteriorates, then the ordinary magnetic disk might be damaged during magnetic recording and reproduction and optimum magnetic recording and reproduction might not be performed.

It should be noted that the above-described disadvantage is a particularly troublesome problem for positioning an ordinary magnetic head unit performing magnetic recording and reproduction in a state in which the magnetic head is in sliding contact with the magnetic disk.

SUMMARY OF THE INVENTION

Accordingly, it is a general object of the present invention to provide an improved and useful magnetic head and structure for supporting same, in which the disadvantages described above are eliminated.

The above-described object of the present invention is achieved by a magnetic head comprising:

a first magnetic head unit for recording to and reproducing from a first flexible rotating recording medium;

a second magnetic head unit for recording to and reproducing from a second flexible rotating recording medium having a coercive force lower than a coercive force of the first flexible rotating recording medium; and a slider supporting the first and second magnetic head units, the second magnetic head unit being attached to the slider using an adhesive, the adhesive including a filler so as to substantially match a coefficient of thermal expansion of the adhesive to a coefficient of thermal expansion of the slider.

According to the invention described above, the adhesive can be restrained from projecting into or retreating from the sliding contact surface and the formation of a difference in level between the second magnetic head unit and the slider can be suppressed even when the ambient temperature at which the magnetic head is being used rises, because the coefficient of thermal expansion at the adhesive is substantially the same as the coefficient of thermal expansion of the slider. As a result, the occurrence of damage to the recording medium can be prevented and reliably stable magnetic recording and reproduction can be achieved.

Additionally, the above-described object of the present invention is also achieved by a magnetic head comprising:

a first magnetic head unit for recording to and reproducing from a first flexible rotating recording medium;

a second magnetic head unit for recording to and reproducing from a second flexible rotating recording medium having a coercive force lower than a coercive force of the first flexible rotating recording medium; and a slider supporting the first and second magnetic head units, the second magnetic head unit being attached to the slider using an adhesive, the adhesive including a filler at a rate of 50 through 80 percent by weight.

According to the invention described above, the coefficient of thermal expansion of the adhesive as a whole including the filler can be reduced.

Accordingly, the coefficient of thermal expansion at the adhesive can be restrained even when the ambient temperature at which the magnetic head is being used rises, and the formation of a difference in level between the second magnetic head unit and the slider can be suppressed. As a result, the occurrence of damage to the recording medium can be prevented and reliably stable magnetic recording and reproduction can be achieved.

Additionally, the above-described object of the present invention is also achieved by the magnetic head as described above, wherein the filler is made of a material having a coefficient of thermal expansion lower than the coefficient of thermal expansion of the adhesive.

According to the invention described above, the coefficient of thermal expansion of the adhesive as a whole including the filler can be reliably reduced because the filler acts to inhibit thermal expansion of the adhesive even as the ambient temperature rises and the adhesive attempts to expand.

Additionally, the above-described object of the present invention is also achieved by the magnetic head as described above, wherein the filler comprises substantially spherical particles having a diameter of 1 $\mu$m or less.

According to the invention described above, the second magnetic head unit can be attached to the slider in an optimum state despite the inclusion of filler in the adhesive.

In other words, it is desirable that the thickness of the adhesive be the minimum amount necessary to fixedly mount the second magnetic head unit on the slider. More specifically, it is desirable that the thickness of the adhesive be 1 $\mu$m or less.

Accordingly, the thickness of the adhesive existing between the second magnetic head unit and the slider can be made to be 1 $\mu$m or less despite the inclusion of filler in the adhesive, and the stability and reliability of the magnetic head can be improved.

Additionally, the above-described object of the present invention is also achieved by a method of manufacturing a magnetic head comprising the steps of:

(a) mounting a first magnetic head unit for recording to and reproducing from a first flexible rotating recording medium; and (b) mounting a second magnetic head unit for recording to and reproducing from a second flexible rotating recording medium having a coercive force lower than a coercive force of the first flexible rotating recording medium, the step (b) of mounting the second magnetic head unit comprising the steps of:

positioning the second magnetic head unit between a slider body and a slider side panel that together form the slider so that a gap of 1 $\mu$m or less is formed between the second magnetic head unit and the slider body and a gap of 1 $\mu$m or less is formed between the second magnetic head unit and the slider side panel; and introducing into each of the gaps an adhesive material containing both filler comprising particles having a diameter exceeding 1 $\mu$m and filler comprising particles having a diameter of 1 $\mu$m or less, using the gaps as a filter such that only the filler comprising particles having a diameter of 1 $\mu$m or less together with the adhesive material fill the gaps.

According to the invention described above, the gaps function as a filter when introducing the adhesive therein.

As a result, of the filler particles of various size only those having a diameter of 1 $\mu$m or less, that is, the width of the gaps, are loaded into the gaps together with the adhesive. Accordingly, the thickness of the adhesive inserted between the second magnetic head unit and the slider can be easily and reliably kept to 1 $\mu$m or less.

Other objects, features and advantages of the present invention will become more apparent from the following detailed description when read in conjunction with the accompanying drawings.

DESCRIPTION OF THE PREFERRED EMBODIMENTS

A description will now be given of an embodiment of the present invention, with reference to the accompanying drawings.

Figure 1:
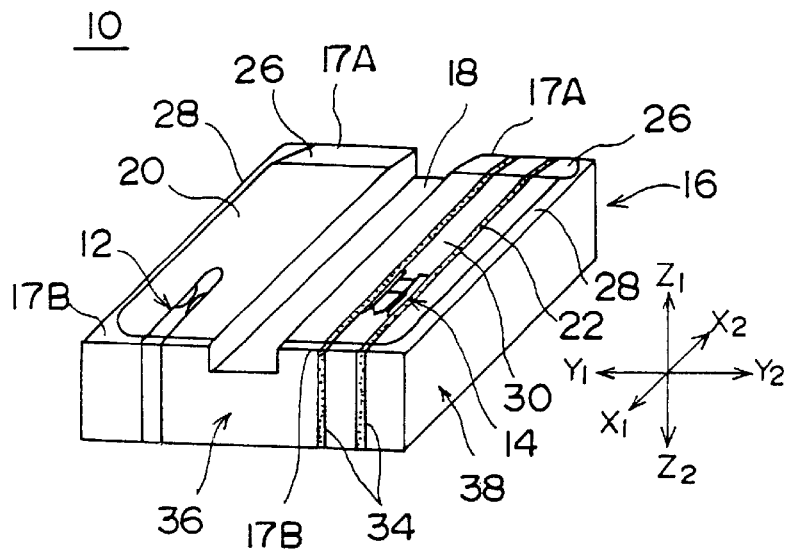
FIG. 1 is a perspective view of an embodiment of a magnetic head according to the present invention.
Figure 2:
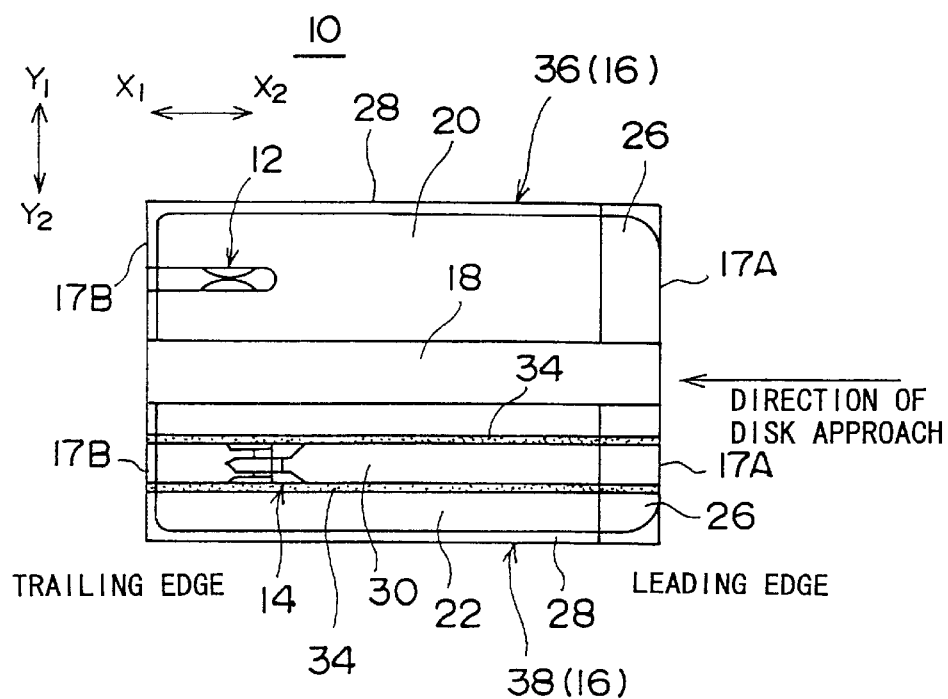
FIG. 2 is a plan view of an embodiment of a magnetic head according to the present invention.

FIG. 1 is a perspective view of an embodiment of a magnetic head 10 according to the present invention. FIG. 2 is a plan view of an embodiment of a magnetic head 10 according to the present invention.

The magnetic head 10 basically comprises a first magnetic head unit 12, a second magnetic head unit 14 and a slider 16. It should be noted that the necessary coil and closed magnetic circuit structure have been omitted from the diagrams for the sake of simplicity of explanation.

The first and second magnetic head units 12, 14 are positioned on air bearing surfaces 20, 22 formed on slider 16. Of the pair of magnetic head units 12, 14, the first magnetic head unit 12 is a magnetic head used for high-capacity magnetic recording and reproduction, and so has a structure adapted to accommodate a magnetic disk, that is, a recording medium, having a coercive force of 1,500 Oe or more.

Additionally, the second magnetic head unit 14 is used for ordinary magnetic recording and reproduction, and so has a structure adapted to accommodate a magnetic disk having a coercive force, for example, of 600–700 Oe.

The second magnetic head unit 14 is constructed so that a read/write gap (R/W gap) and an erase gap (E gap) are formed by sandwiching a gap member between magnetic head cores 30. In other words, the magnetic head 10 according to the present embodiment has a so-called compatible-type magnetic head structure, capable of performing both ordinary magnetic recording and reproduction as well as high-capacity magnetic recording and reproduction.

The slider 16 is a block member formed, for example, of a ceramic. The slider 16 supports the first and second magnetic head units 12, 14 and also provides a force for elevating the magnetic head 10 so that the magnetic head 10 floats over the magnetic disk when performing high-capacity magnetic recording and reproduction.

Essentially, the slider 16 comprises a slider body 36 and a slider side panel 38. Additionally, the slider also comprises a central groove 18, a first air bearing surface 20, a second air bearing surface 22, a slanting surface 26 and a chamfered part 28.

The central groove 18 is formed at a position in a center of a width of a top surface of the slider 16, that is, in a direction indicated by arrows Y1–Y2 in the drawing, so as to extend longitudinally in a direction of travel of the magnetic disk, that is, in a direction indicated by the arrows X1–X2 in the drawing. By forming the central groove 18, the first and second air bearing surfaces 20 and 22 are formed so as to sandwich the central groove of the slider 16.

In order for the magnetic head 10 to float properly over the magnetic disk, the air flow generated between the slider 16 and the magnetic disk must be smooth. It is for this purpose that the first and second air bearing surfaces 20, 22 are formed as highly flat surfaces.

Additionally, the slanting surface 26 extending across a predetermined range is formed on the leading edge of the slider 16, that is, the X2 edge, on a side from which the magnetic disk approaches the magnetic head. This slanting surface 26 forms a predetermined angle with respect to the first and second air bearing surfaces 20, 22. By forming the slanting surface 26 on the leading edge of the slider 16 facing the approaching magnetic disk, a hard collision between the magnetic disk and the slider 16 can be prevented.

It should be noted that, in the following description, the X1 edge of the slider 16 facing the magnetic disk as it approaches is referred to as a leading edge 17A. Additionally, the X2 edge of the slider 16 facing the magnetic disk as it withdraws is referred to as a trailing edge 17B.

Additionally, the chamfered part 28 is formed on an outer periphery of the first and second air bearing surfaces 20, 22. Providing the chamfered part 28 also prevents the magnetic disk from colliding hard against the slider 16 when the magnetic head 10 is in a floating state.

During magnetic recording and reproduction of a high-capacity magnetic disk, the speed of rotation of the high-capacity magnetic disk increases and so, too, does a relative speed between magnetic disk and the first and second air bearing surfaces 20, 22 of the slider 16. An elevating force obtained by a change in air flow as a result of this increase in relative speed causes the above-described magnetic head 10 to float over the magnetic disk and magnetic recording and reproduction is performed while a state of non-contact between the magnetic head and the magnetic disk is maintained.

By contrast, during magnetic recording and reproduction of a magnetic disk having an ordinary capacity the speed of rotation of the magnetic disk is relatively slow compared to the speed of rotation of the magnetic disk during high-capacity magnetic recording and reproduction. Accordingly, a relative speed between the magnetic disk and the first and second air bearing surfaces 20, 22 also slows, and magnetic recording and reproduction is performed while the second magnetic head unit 14 is in a state of sliding contact with the magnetic disk.

Therefore, particularly when performing ordinary magnetic recording and reproduction using the second magnetic head unit 14, it is necessary that the surface of the second magnetic head unit 14 that is in sliding contact with the magnetic disk be as flat as possible.

In order to facilitate an understanding of the advantages of the present invention a description will now be given of the supporting structure of the second magnetic head unit 14 with respect to the slider 16.

As described above, the second magnetic head unit 14 is used to perform magnetic recording and reproduction of an ordinary magnetic disk having a coercive force of for example 600–700 Oe, so the magnetic gap is relatively wide and thus a bulk-type magnetic head structure is used. The second magnetic head unit 14 is fixedly mounted on the slider 16 using an adhesive 34. For clarity of explanation a description of a method for manufacturing the magnetic head 10 is deferred until later.

According to the present embodiment, the adhesive 34 used to attach the second magnetic head unit 14 to the slider 16 includes a filler. The present embodiment uses small particles of silica as the filler, but it is also possible to use ceramic or other materials in place of the silica.

Additionally, the filler selected for inclusion in the adhesive 34 is characterized by having a coefficient of thermal expansion that is lower than the coefficient of thermal expansion of the adhesive 34. The filler thus acts to impede expansion of the adhesive 34 even when the ambient temperature at which the magnetic head 10 is being used rises. As a result, the coefficient of thermal expansion of the adhesive as a whole including the filler can be reliably reduced.

By including filler in the adhesive as described above, the coefficient of thermal expansion of the slider 16 and the coefficient of thermal expansion of the adhesive 34 can be substantially matched, that is, can be made to be substantially the same.

A description will now be given of the relation between the amount of filler included in the adhesive 34 and the coefficient of thermal expansion of the adhesive 34, with reference to FIG. 3.

Figure 3:
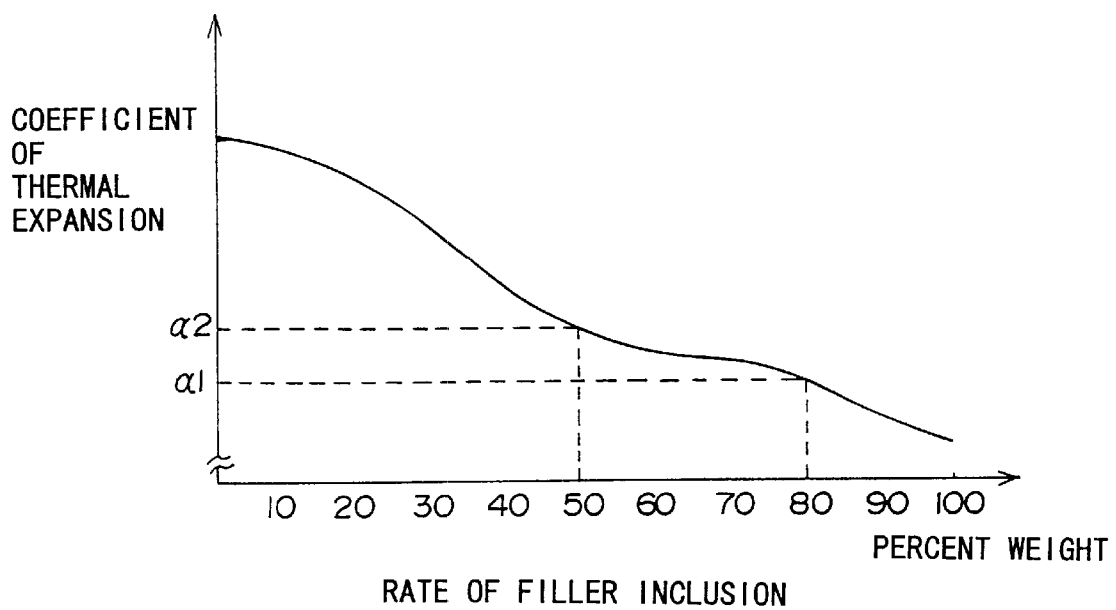
FIG. 3 is a diagram showing the relation between rate of filler inclusion and coefficient of thermal expansion.

FIG. 3 is a diagram showing the relation between rate of filler inclusion and coefficient of thermal expansion, in a case in which epoxy resin is used as the adhesive 34 and silica is used as the filler. In the diagram, the horizontal axis of the chart represents the amount of filler included as percent weight, hereinafter referred to as rate of filler inclusion, and the vertical axis represents coefficient of expansion. Further, the range indicated as $\acute{a}1$ through $\acute{a}2$ is the permissible range of coefficient of thermal expansion of the slider 16 under normal operating conditions for the magnetic head 10.

According to the diagram, when the rate of filler inclusion is low the characteristics of the adhesive 34 appear most strongly and thus the coefficient of thermal expansion increases. Therefore use of adhesive having a high coefficient of thermal expansion as described above, as noted in the Description of the Related Art section, leads to an undesirable situation in which the hardened adhesive protrudes above the sliding contact surface as the ambient temperature rises, or a difference in level occurs between the slider and the magnetic head unit.

By contrast, by increasing the rate of filler inclusion the coefficient of thermal expansion of the adhesive 34 as a whole including the filler can be reduced. In order to match the coefficient of thermal expansion of the adhesive 34 to the coefficient of thermal expansion of the slider 16 as described above, in the present embodiment the rate of filler inclusion is set to be not less than 50 percent and not more than 80 percent. In other words, the filler constitutes between 50 percent and 80 percent by weight of the mixed adhesive-filler compound.

By setting the rate of filler inclusion as described above, the coefficient of thermal expansion of the adhesive 34 comes to approximate the coefficient of thermal expansion of the slider 16 as shown in FIG. 3, such that the protrusion into or withdrawal from the sliding contact surface near the second magnetic head unit 14 of the adhesive 34, or the formation of a difference in level between the second magnetic head unit 14 on the one hand and the slider body 36 and the slider side panel 38 that together form the slider 16, can be restrained even when the ambient temperature at which the magnetic head 10 is being used changes. As a result, damage to the magnetic disk during normal magnetic recording and reproduction can be prevented and reliably stable magnetic recording and reproduction can be achieved.

It should be noted that the characteristics shown in FIG. 3 would be substantially the same even if the filler material were to be changed. Additionally, it should be noted that ceramic is the most common material used for the slider 16. Accordingly, so long as the rate of filler inclusion is not less than 50 percent and not more than 80 percent, the effect described above can be achieved without regard to the material used for the filler.

Additionally, in the present embodiment the filler comprises substantially spherical particles having a diameter of 1 $\mu$m or less. By using filler particles having a substantially spherical shape and having a diameter of 1 $\mu$m or less, the second magnetic head unit can be attached to the slider in an optimum state. A description will now be given of the reason such optimum adhesion can be performed by using filler particles having a substantially spherical shape and having a diameter of 1 $\mu$m or less, and of a method for manufacturing a magnetic head such that only those filler particles having a diameter of 1 $\mu$m or less are included in the adhesive 34 positioned on the magnetic head 10.

It is desirable that the thickness of the adhesive be the minimum amount necessary to fixedly mount the second magnetic head unit on the slider. More specifically, it is desirable that the thickness of the adhesive be 1 $\mu$m or less. This is because the adhesive 34 is less stable than either the second magnetic head unit 14 or the slider 16, so in order to improve the reliability of the magnetic head 10 it is better that the amount of adhesive 34 used be as small as possible.

Assuming for the moment that the filler particles are of random shape and have a diameter of 1 $\mu$m or more, then an adhesive containing such filler is inserted between the second magnetic head unit 14 and the slider 16 will have a thickness of 1 $\mu$m or more. For this reason, in the present embodiment, during the process of manufacturing the magnetic head 10 only those filler particles having a diameter of 1 $\mu$m or less are inserted between the second magnetic head unit 14 and the slider 16.

Figure 4:
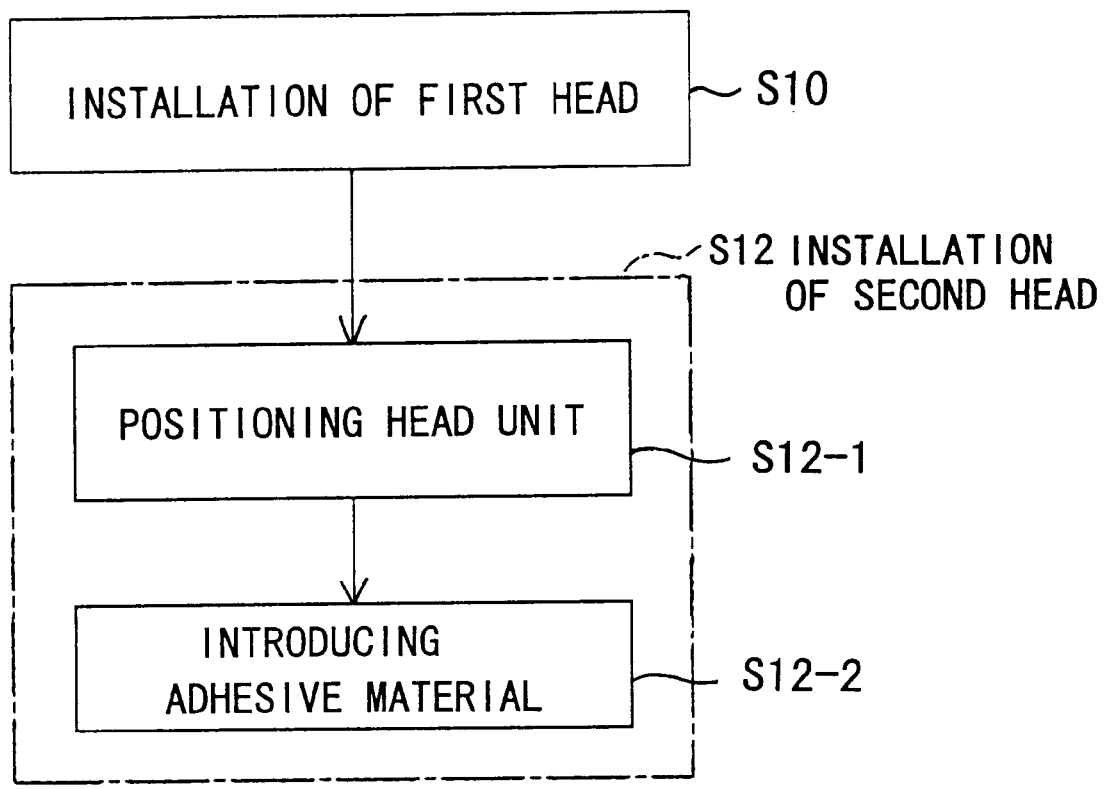
FIG. 4 is a flow chart showing steps in the manufacture of a magnetic head according to the present invention.

A description will now be given of a method for manufacturing such a magnetic head 10 as shown in FIG. 4. It should be noted that the process of manufacturing the magnetic head 10 includes the step of attaching the first magnetic head unit 12 to the slider 16 and the step of attaching the second magnetic head unit 14 to the slider 16. However, the embodiment of a magnetic head according to the present invention concerns the step of attaching the second magnetic head unit 14 to the slider 16, therefore the following description pertains to the step of attaching the second head unit 14 to the slider 16 and a description of the step of attaching the first magnetic head unit 12 to the slider 16 is omitted.

The step of attaching the second magnetic head unit comprises, first, placing the second magnetic head unit 14 between the slider body 36 and the slider side panel 38 so as to form a gap of 1 $\mu$m or less between the slider body 36 and the second magnetic head unit 14 and between the slider side panel 38 and the second magnetic head unit 14. This step of positioning the second magnetic head unit 14 between the slider body 36 and the slider side panel 38 can be accomplished relatively easily by using a positioning tool for that purpose.

Next, adhesive 34 into which filler has been mixed is introduced into the gaps formed on both sides of the second magnetic head unit 14, that is, in the gap between the second magnetic head unit 14 and the slider body 36 and in the gap between the second magnetic head unit 14 and the slider side panel 38. At this time, the filler contains a mixture of particles having a diameter exceeding 1 $\mu$m as well as particles having a diameter of 1 $\mu$m or less. The filler has a mixture of particles of different diameters because the filler is originally manufactured to have a mixture of particles of different diameters and, as a practical matter, it is difficult to extract a filler having particles of a specific diameter from a filler having particles of different diameters.

However, as described above, in the method of manufacturing a magnetic head according to the present invention, prior to the introduction of the adhesive 34 a gap of 1 $\mu$m or less is already formed between the slider body 36 and the second magnetic head unit 14 and between the slider side panel 38 and the slider side panel 38.

Accordingly, when adhesive 34 containing a mixture of particles having a diameter exceeding 1 $\mu$m as well as particles having a diameter of 1 $\mu$m or less is introduced into the above-described gaps, the gaps act as filters such that only those filler particles having a diameter equal to or less than the width of the gaps, that is, 1 $\mu$m or less, are loaded into the gaps together with the adhesive. As a result, the thickness of the adhesive 34 existing between the second magnetic head unit 14 and the slider 16 can be made to be 1 $\mu$m or less.

Additionally, because adhesive 34 together with filler particles having a diameter of 1 $\mu$m or less is automatically loaded into the gaps simply by loading the gaps with adhesive including filler particles of different sizes, the thickness of the adhesive 34 provided between the second magnetic head unit 14 and the slider 16 can be kept to 1 $\mu$m or less extremely easily and reliably.

It should be noted that although including filler in a resin is carried out conventionally, the conventional purpose is to strengthen the resin. Additionally, even among resins it is not often that filler is included in the adhesive.

However, though rare, adhesives containing filler are sometimes seen. Nevertheless, in these cases the filler is included for the purpose of enhancing the adhesive strength of the adhesive. Accordingly, it should be noted that the addition of this type of filler to the adhesive serves an altogether different purpose from that of the present invention, in which the filler is included for the purpose of changing the coefficient of thermal expansion of the adhesive.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope of the present invention.

What is claimed is:

1. A method of manufacturing a magnetic head comprising the steps of:
   (a) mounting a first magnetic head unit for recording to and reproducing from a first flexible rotating recording medium; and
   (b) mounting a second magnetic head unit for recording to and reproducing from a second flexible rotating recording medium having a coercive force lower than a coercive force of the first flexible rotating recording medium,
   the step (b) of mounting the second magnetic head unit further comprising the steps of:
      positioning the second magnetic head unit between a slider body and slider side panel that together form a slider so that a gap of 1 μm or less is formed between the second magnetic head unit and the slider body and a gap of 1 μm or less is formed between the second magnetic head unit and the slider side panel; and
      introducing into each of the gaps an adhesive material containing both filler comprising particles having a diameter exceeding 1 μm and filler comprising particles having a diameter of 1 μm or less, using the gaps as a filter such that only the filler comprising particles having a diameter of 1 μm or less together with the adhesive material fill the gaps.

2. A magnetic head comprising:
   a first magnetic head unit for recording to and reproducing from a flexible rotating recording medium;
   a slider supporting the first magnetic head unit,
   a second magnetic head unit for recording to and reproducing from a second flexible rotating recording medium having a coercive force lower than a coercive force of the first flexible rotating recording medium, wherein said second magnetic head unit is disposed between a slider body and a slider side panel that together form said slider so that the second magnetic head unit and the slider body are separated by a gap of 1 μm or less and the second magnetic head unit and the slider side panel are separated by a gap of 1 μm or less; and
   each of the gaps including an adhesive material containing both filler comprising particles having a diameter exceeding 1 μm and filler comprising particles having a diameter of 1 μm or less, whereby the gaps provide a filter such that only the filler comprising particles having a diameter of 1 μm or less together with the adhesive material fill the gaps.

3. A magnetic head comprising:
   a first magnetic head unit for recording to and reproducing from a first flexible rotating recording medium;
   a second magnetic head unit for recording to and reproducing from a second flexible rotating recording medium having a coercive force lower than a coercive force of the first flexible totating recording medium; and
   a slider supporting the first and second magnetic head units,
   the second magnetic head unit being attached to the slider using an adhesive, the adhesive including a filler so as to substantially match a thermal expansion rate of said adhesive to a thermal expansion rate of the slider wherein said second magnetic head is disposed between a slider body and a slider side panel that together form said slider so that a gap of 1 μm or less is formed between the second magnetic head unit and the slider body and a gap of 1 μm or less is formed between the second magnetic head unit and the slider side panel; and
   each of the gaps including said adhesive further comprises a material containing both filler comprising particles having a diameter exceeding 1 μm and filler comprising particles having a diameter of 1 μm or less, so that the gaps provide a filter such that only the filler comprising particles having a diameter of 1 μm or less together with the adhesive material fill the gaps.

4. A magnetic head comprising:
   a first magnetic head unit for recording to and reproducing from a first flexible rotating recording medium;
   a second magnetic head unit being recording to and reproducing from a second flexible rotating recording medium having a coercive force lower than a coercive force of the first flexible rotating recording medium; and
   a slider supporting the first and second magnetic head units,
   the second magnetic head unit being attached to the slider using an adhesive, wherein said second magnetic head is disposed between a slider body and a slider side panel that together form said slider so that a gap of 1 μm or less is formed between the second magnetic head unit and the slider body and a gap of 1 μm or less is formed between the second magnetic head unit and the slider side panel; and
   each of the gaps including said adhesive further comprises a material containing both filler comprising particles having a diameter exceeding 1 μm and filler comprising particles having a diameter of 1 μm or less, so that the gaps provide a filter such that only the filler comprising particles having a diameter of 1 μm or less together with the adhesive material fill the gaps and the adhesive including a filler at a rate of 50 through 80 percent by weight.

* * * * *